United States Patent [19]
Liotta et al.

[11] Patent Number: 4,760,119
[45] Date of Patent: Jul. 26, 1988

[54] POLYACETAL COMPOSITIONS WITH IMPROVED HYDROLYTIC STABILITY

[75] Inventors: Charles L. Liotta, Marietta, Ga.; Norman E. West, Vienna, W. Va.

[73] Assignee: E. I. Du Pont de Nemours and Company, Wilmington, Del.

[21] Appl. No.: 857,904

[22] Filed: Apr. 30, 1986

[51] Int. Cl.$^4$ .............................................. C08L 61/02
[52] U.S. Cl. .................... 525/398; 525/400; 525/405; 525/408
[58] Field of Search ............... 525/398, 405, 400, 408

[56] References Cited

U.S. PATENT DOCUMENTS 3,631,124 12/1971 Burg et al. ........................ 525/405
3,795,715 3/1974 Cherdron et al. ................. 525/398
4,351,916 9/1982 Kohan ................................ 524/377

FOREIGN PATENT DOCUMENTS 57-163144 12/1981 Japan .

OTHER PUBLICATIONS

Copending U.S. Application Serial No. 763,613, filed May 21, 1986, by Wagman (AD-5453).

Primary Examiner—Theodore E. Pertilla

[57] ABSTRACT

Incorporation of 0.6-5.0 weight percent of certain ethylene oxide/propylene oxide copolymers into polyacetal molding compositions results in improved hydrolytic stability of such compositions.

12 Claims, No Drawings

POLYACETAL COMPOSITIONS WITH IMPROVED HYDROLYTIC STABILITY

DESCRIPTION

1. Technical Field

This invention relates to certain polyacetal compositions which are characterized by improved hydrolytic stability, shaped articles made from such polyacetal compositions and a method for preparing such compositions. For the purposes of this invention, polyacetal compositions include compositions based on homopolymers of formaldehyde or of cyclic oligomers of formaldehyde, for example, trioxane, the terminal groups of which homopolymers are end-capped by esterification or etherification. Compositions based on polyacetals of relatively high molecular weight, i.e. 10,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished articles made from such compositions possess desirable physical properties, including high stiffness, strength, low coefficient of friction and good solvent resistance. However, in certain applications, it would be desirable to have greater hydrolytic stability than has heretofore been possible with conventional polyacetal compositions.

2. Background Art

U.S Pat. No. 4,351,916, granted to Kohan discloses adding ethylene oxide polymer to polyacetal compositions as a processing aid.

Japanese Patent Publication No. 57/163144, published Dec. 15, 1981, discloses adding ethylene glycol polymer to polyacetal compositions to enhance hydrolytic stability.

DISCLOSURE OF THE INVENTION

This invention relates to certain polyacetal compositions which are characterized by improved hydrolytic stability. The term "polyacetal" as used herein includes homopolymers of formaldehyde or of cyclic oligomers of formaldehyde, the terminal groups of which are end-capped by esterification or etherification.

It has been found that polyacetals can be formulated into compositions having improved hydrolytic stability. More specifically, when polyacetals are melt compounded with certain ethylene oxide/propylene oxide copolymers, the resulting compositions are characterized by improved stability as measured by lower weight loss during prolonged immersion in boiling water.

The polyacetals used in the compositions of the present invention can be branched or linear and will generally have a number average molecular weight in the range of 10,000 to 100,000, preferably 30,000 to 70,000. The molecular weight can conveniently be measured by gel permeation chromatography in m-cresol at 160° C. using a Du Pont PSM bimodal column kit with nominal pore size of 60 and 1000 Å. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal will be a homopolymer. Preferred polyacetal homopolymers include those whose terminal hydroxyl groups have been end-capped by a chemical reaction to form ester or ether groups, preferably acetate or methoxy groups, respectively.

The ethylene oxide/propylene oxide copolymers used in the compositions of the present invention will comprise 50 to 90 weight percent ethylene oxide and 10 to 50 weight percent propylene oxide. Preferably, the proportion of ethylene oxide will be 65 to 85 weight percent, most preferably, 70 to 80 weight percent.

The ethylene oxide/propylene oxide copolymers will be present in the compositions of the present invention in the amount of 0.6 to 5.0 weight percent, based on the amount of polyacetal, preferably 0.8–3.0 weight percent and most preferably 0.8–1.5 weight percent.

Commercially available ethylene oxide/propylene oxide copolymers may contain nonvolatile residues or ash at levels of 700 ppm or more. Although such residues do not adversely affect the hydrolytic stability of the compositions of the present invention, thermal stability can be adversely affected by such residue. Accordingly, it is preferred that the ethylene oxide/propylene oxide copolymers be purified, e.g., by treating a water solution of the copolymer on a mixed bed ion exchange column, i.e., an ion exchange column containing polynuclear sulfonic acid and polynuclear quaternary ammonium hydroxide resins. The purified copolymer can then be recovered by evaporation of the water.

The molecular weight of the ethylene oxide/propylene oxide copolymers used in the compositions of the present invention is not critical. Low molecular weight copolymers are contemplated, as are high molecular weight copolymers. Although for ease of processing and commercial availability, it is generally preferred that the copolymers have a molecular weight from 4,000–20,000, preferably 8,000–17,000, most preferably, 12,000–15,000.

It should be understood that the compositions of the present invention can include, in addition to the polyacetal and the ethylene oxide/propylene oxide copolymer, other ingredients, modifiers and additives as are generally used in polyacetal molding resins, includng co-stabilizers, anti-oxidants, pigments, colorants, toughening agents, reinforcing agents and fillers. It is preferred that the compositions of the present invention include nylon costabilizers. Such costabilizers, as are exemplified in this application, not only give the expected enhancement in thermal stability, but also give an unexpected enhancement in hydrolytic stability.

The compositions of the present invention can be prepared using any intensive mixing device conventionally used in preparing thermoplastic polyacetal compositions, such as rubber mills, internal mixers such as "Banbury" and "Brabender" mixers, single or multi-blade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing, such as valves, gates or screws designed for this purpose. Extruders are preferred.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

The compositions of the present invention can be prepared by mixing the ethylene oxide/propylene oxide copolymer with the polyacetal polymer at a temperature above the melting points of the components of the composition and below the temperature at which degradation of the components will occur.

Processing conditions used in the preparation of the compositions of the present invention and shaped articles made therefrom include melt temperatures of about 170°–260° C., preferably 185°–240° C., most preferably 200°–230° C. When injection molding the compositions of the present invention, it is preferred that the mold be as cold as possible consistent with the intracacy of the shape being produced. Generally, the mold temperature will be 10°–120 ° C., preferably 10°–100° C., and most preferably about 50°–90° C.

In the following examples, there are shown specific embodiments of the present invention and certain comparisons with embodiments of control experiments outside the limits of the present invention. It will be seen that the compositions of the present invention are characterized by improved hydrolytic stability. All parts and percentages are by weight, and all temperatures are in degrees Celsius unless otherwise specified. Measurements not originally in SI units have been so converted and rounded where appropriate.

In the following examples, two different polyacetals were used:

(a) "polyacetal A" was acetate end-capped homopolymer having a number average molecular weight of about 65,000; and (b) "polyacetal B" was acetate end-capped homopolymer having a number average molecular weight of about 40,000.

In the following examples, four different hydrolytic stabilizers were used:

(a) "stabilizer A" was polyethylene oxide having an average molecular weight of about 8000;

(b) "stabilizer B" was an 80% ethylene oxide, 20% propylene oxide copolymer having an average molecular weight of about 13,000;

(c) "stabilizer C" was an 80% ethylene oxide, 20% propylene oxide copolymer having an average molecular weight of about 14,600; and (d) "stabilizer D" was a 75% ethylene oxide, 25% propylene oxide copolymer having an average molecular weight of about 12,000.

Each of the compositions in the following examples was compounded in a single screw extruder at a temperature of 215° C. to form a homogeneous product that was quenched in water and cut into convenient size pieces for further processing.

The compositions thus compounded were molded into tensile bars using a BOY model 50T molding machine. The compositions were melted at 205° C. in the melting section of the molding machine and the hot melt was injected into a mold. The mold temperature was maintained at 93° C. The bars thus molded weighed about 16 grams and measured 3.175 mm thick, 12.7 mm wide in the necked down portion of the bar, and the bars were nominally 12.5 cm long.

Tensile strength and elongation were measured using ASTM D-638 procedures. The tensile bars were marked for identification with a vibrating engraver and the weight of each bar was measured to the nearest 0.0001 gram. Fifteen of the test bars were placed in a 3 liter resin kettle containing 2700 ml of demineralized water, which was then heated under reflux continuously for the time periods in the Examples. Three bars were removed from the boiling water bath at each time interval, dried in a vacuum oven at 65° C. for 48 hours, cooled in a desiccator, and then weighed to the nearest 0.0001 gram. The weight loss for the three individual bars was calculated, and the average weight loss is shown in the Examples.

EXAMPLES 1–13

The compositions of each of the following Examples included 0.1 weight percent of hydrocinnamic acid (3,5-di-tert-butyl-4-hydroxy-neopentane-tetraaryl ester) antioxidant and 1 weight percent of a 33/23/43 terpolymer of nylon 66, nylon 6/10 and nylon 6, respectively, as a thermal stabilizer. The remainder of the composition, in each case, is summarized in Table 1, below:

TABLE 1

| Example | Polyacetal | Amount | Hydrolytic Stabilizer | Amount |
|---|---|---|---|---|
| 1 | A | 97.9% | A | 1% |
| 2 | A | 97.9% | B | 1% |
| 3 | B | 97.9% | A | 1% |
| 4 | B | 97.9% | B | 1% |
| 5 | A | 97.9% | C | 1% |
| 6 | A | 97.9% | B | 1% |
| 7 | A | 97.9% | A | 1% |
| 8 | A | 97.9% | B | 1% |
| 9 | A | 97.9% | D | 1% |
| 10 | A | 97.9% | B purified | 1% |
| 11 | A | 97.9% | A | 1% |
| 12 | A | 98.47% | B | 0.43% |
| 13 | A | 98.9% | — | — |

Examples 1 and 2 show a direct comparison of ethylene oxide homopolymer with ethylene oxide/propylene oxide (80/20) copolymer.

Examples 3 and 4 show a similar direct comparison, except the polyacetal is of lower molecular weight.

Examples 5, 6 and 7 show a direct comparison similar to Examples 1 an 2, except an ethylene oxide/propylene oxide (80/20) copolymer of higher molecular weight is also included.

Examples 8, 9, 10, 11 show a similar direct comparison, but also including an ethylene oxide/propylene oxide (75/25) copolymer (Example 9) and an ethylene oxide/propylene oxide (80/20) copolymer (Example 10) that has been purified as described above.

Examples 12 and 13 show a direct comparison of ethylene oxide/propylene oxide (80/20) copolymer with no hydrolytic stabilizer.

The results of these experiments are shown in Table 2, below. In that table, WL=weight loss, in percent, TS=tensile strength in MPa; and E=elongation in percent.

TABLE 2

| Ex. | Time in 100° C. Boiling Water | | | | | |
|---|---|---|---|---|---|---|
| | WL | TS | E | WL | TS | E |
| | 20 days | | | 40 days | | |
| 1 | .25 | 71.0 | 46 | 2.18 | 69.8 | 50 |
| 2 | .60 | 72.5 | 65 | 1.72 | 70.1 | 32 |
| 3 | .96 | 71.2 | 18 | 2.02 | 70.0 | 14 |
| 4 | .97 | 71.1 | 24 | 1.69 | 70.2 | 17 |
| 5 | .83 | 73.9 | 41 | 1.79 | 73.0 | 48 |
| 6 | 1.38 | 74.1 | 52 | 2.36 | 77.2 | 40 |
| 7 | 1.06 | 73.8 | 34 | 2.23 | — | — |
| 8 | .93 | 74.5 | 56 | 1.66 | 72.7 | 34 |
| 9 | 1.02 | 74.3 | 45 | 1.69 | 72.5 | 25 |
| 10 | .73 | 74.3 | 49 | 1.49 | 72.7 | 41 |
| 11 | .99 | 76.0 | 60 | 2.12 | 73.8 | 45 |
| 12 | .72 | 72.6 | 34 | 1.96 | 65.0 | 14 |
| 13 | 1.40 | 70.3 | 21 | 8.85 | 40.7 | 6 |
| | 60 days | | | 90 days | | |
| 1 | 3.32 | 70.1 | 40 | 9.08 | 47.2 | 9 |
| 2 | 2.62 | 71.6 | 40 | 3.97 | 65.5 | 26 |
| 3 | 5.71 | 62.0 | 8.5 | — | — | — |
| 4 | 3.51 | 67.4 | 11 | — | — | — |
| 5 | 2.62 | 71.9 | 44 | 6.31 | 63.8 | 24 |
| 6 | 3.44 | 71.5 | 27 | 5.30 | 67.4 | 26 |
| 7 | 4.47 | 67.2 | 24 | 13.8 | 49.2 | 13 |
| 8 | 2.82 | 68.3 | 21 | 5.21 | 65.2 | 24 |
| 9 | 2.54 | 70.5 | 25 | 4.48 | 66.2 | 20 |
| 10 | 2.48 | 71.6 | 34 | 4.49 | 66.9 | 22 |
| 11 | 4.05 | 68.5 | 25 | 12.10 | 50.9 | 10 |
| 12 | 6.08 | 51.4 | 8 | — | — | — |
| 13 | — | — | — | — | — | — |

We claim:

1. A thermoplastic polyacetal composition consisting essentially of
    (a) 0.6–5 weight percent of at least one copolymer of ethylene oxide and propylene oxide, and
    (b) 95–99.4 weight percent of at least one polyacetal homopolymer, provided that the above-stated percentages are based on the total amount of components (a) and (b) only, and provided further that the copolymer of component (a) comprises 50–90 weight percent ethylene oxide units and 10–50 weight percent propylene oxide units.

2. The composition of claim 1 wherein component (a) comprises 0.8–3.0 weight percent of the composition.

3. The composition of claim 1 wherein component (a) comprises 0.8–1.5 weight percent of the composition.

4. The composition of claim 1 wherein the copolymer of component (a) comprises 65–85 weight percent ethylene oxide units and 15–35 weight percent propylene oxide units.

5. The composition of claim 1 wherein the copolymer of component (a) comprises 70–80 weight percent ethylene oxide units and 20–30 weight percent propylene oxide units.

6. The composition of claim 1 wherein the molecular weight of the copolymer of component (a) is 4,000–2,000.

7. The composition of claim 1 wherein the molecular weight of the copolymer of component (a) is 8,000–17,000.

8. The composition of claim 1 wherein the molecular weight of the copolymer of component (a) is 12,000–15,000.

9. The composition of claim 1 wherein the polyacetal has a number average molecular weight of 10,000–100,000.

10. The composition of claim 1 further comprising at least one of co-stabilizers, antioxidants, pigments, colorants, reinforcing agents, toughening agents and fillers.

11. The composition of claim 1 further comprising a nylon co-stabilizer.

12. Shaped articles made from the composition of claim 1.

* * * * *

UNITED STATES PATENT AND TRADEMARK OFFICE
CERTIFICATE OF CORRECTION

PATENT NO.   :   4,760,119
DATED        :   JULY 26, 1988
INVENTOR(S)  :   Charles L. Liotta
                 Norman E. West It is certified that error appears in the above-identified patent and that said Letters Patent is hereby corrected as shown below:

Claim 6, Column 6, line 20, "4,000-2,000" should be -- 4,000-20,000 --.

Signed and Sealed this

Twenty-fourth Day of January, 1989

*Attest:*

DONALD J. QUIGG

*Attesting Officer*    *Commissioner of Patents and Trademarks*